(12) United States Patent  (10) Patent No.: US 8,015,828 B2
Moniz et al.  (45) Date of Patent: Sep. 13, 2011

(54) POWER TAKE-OFF SYSTEM AND GAS TURBINE ENGINE ASSEMBLY INCLUDING SAME

(75) Inventors: Thomas Ory Moniz, Loveland, OH (US); Jan Christopher Schilling, Middletown, OH (US); Robert Joseph Orlando, West Chester, OH (US); Raymond Felix Patt, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1147 days.

(21) Appl. No.: 11/695,741

(22) Filed: Apr. 3, 2007

(65) Prior Publication Data

US 2009/0064683 A1  Mar. 12, 2009

(51) Int. Cl.
*F02C 7/26* (2006.01)
*F02C 7/22* (2006.01)
*F02C 7/275* (2006.01)

(52) U.S. Cl. .............................. 60/786; 60/778; 60/788

(58) Field of Classification Search ................ 60/786, 60/788, 226.31, 262, 268, 39.162, 39.163, 60/778
See application file for complete search history.

(56) References Cited

U.S. PATENT DOCUMENTS

| | | | |
|---|---|---|---|
| 3,617,762 A * | 11/1971 | Price et al. ...................... 290/46 |
| 3,688,560 A | 9/1972 | Broman et al. | |
| 4,057,960 A | 11/1977 | Werner | |
| 4,186,554 A | 2/1980 | Possell | |
| 4,257,281 A * | 3/1981 | Bunger ............................... 74/6 |
| 4,862,755 A | 9/1989 | Eastman et al. | |
| 4,936,748 A * | 6/1990 | Adamson et al. ............. 416/123 |
| 5,081,832 A | 1/1992 | Mowill | |
| 5,247,845 A | 9/1993 | Grayson | |
| 5,349,814 A * | 9/1994 | Ciokajlo et al. ............. 60/226.1 |
| 5,694,765 A * | 12/1997 | Hield et al. ................. 60/39.163 |
| 5,867,979 A * | 2/1999 | Newton et al. .............. 60/226.1 |
| 6,055,946 A | 5/2000 | Dombek et al. | |
| 6,058,791 A | 5/2000 | Brunet | |
| 6,647,708 B2 | 11/2003 | Bornhoft et al. | |
| 6,672,049 B2 * | 1/2004 | Franchet et al. ............. 60/226.1 |
| 6,763,654 B2 * | 7/2004 | Orlando et al. ............. 60/226.1 |
| 7,552,591 B2 * | 6/2009 | Bart et al. ........................ 60/792 |
| 2004/0065091 A1 * | 4/2004 | Anderson ........................ 60/778 |
| 2007/0022735 A1 * | 2/2007 | Henry et al. ............... 60/39.162 |
| 2007/0151258 A1 * | 7/2007 | Gaines et al. .................... 60/792 |
| 2007/0267540 A1 * | 11/2007 | Atkey et al. ..................... 244/58 |

OTHER PUBLICATIONS

Thomas Ory Moniz et al.; Power Take-Off System and Gas Turbine Engine Assembly Including Same; U.S. Appl. No. 11/614,623, filed Dec. 21, 2006; 14 pgs.

* cited by examiner

*Primary Examiner* — Michael Cuff
*Assistant Examiner* — Young Choi
(74) *Attorney, Agent, or Firm* — William Scott Andes, Esq.; Armstrong Teasdale LLP

(57) ABSTRACT

A power take-off system for a gas turbine engine includes a starter coupled to a second spool, and a clutch assembly coupled between the starter and a first spool, the clutch assembly configured to couple the first spool to the starter when starting the gas turbine engine assembly. A method of assembling a gas turbine engine assembly that includes the power take-off system, and a gas turbine engine assembly including the power take-off system are also described.

25 Claims, 7 Drawing Sheets

POWER TAKE-OFF SYSTEM AND GAS TURBINE ENGINE ASSEMBLY INCLUDING SAME

BACKGROUND OF THE INVENTION

This invention relates generally to gas turbine engines, and more specifically to a dual input/output power take-off system configured to start the gas turbine engine and also configured to generate electrical power.

At least some known gas turbine engines used with aircraft include a core engine having, in serial flow arrangement, a compressor which compresses airflow entering the engine, a combustor which burns a mixture of fuel and air, and low and high-pressure turbines which extract energy from airflow discharged from the combustor to generate thrust.

As aircraft accessory power demands have increased, there also has been an increased need to run the gas turbine engines at idle speeds that may be higher than other engines not subjected to increased power demands. More specifically, increasing the gas turbine engine idle speed enables the increased power demands to be met without sacrificing compressor stall margins. However, the increased idle speed may also generate thrust levels for the engine which are higher than desired for both flight idle descent operations and/or during ground idle operations. Over time, continued operation with increased thrust levels during such idle operations may increase maintenance costs and the increased fuel flow requirements may also increase aircraft operating expenses.

BRIEF SUMMARY OF THE INVENTION

In one aspect, a method for assembling a gas turbine engine assembly is provided. The gas turbine engine assembly includes a first spool including a high-pressure compressor, a high-pressure turbine, and shaft coupled between the high-pressure compressor and the high-pressure turbine, and a second spool that is disposed coaxially with the first spool. The method includes coupling a starter to the second spool using a drive shaft, and coupling a clutch assembly between the starter and the first spool such that the clutch assembly is configured to couple the starter to the first spool when starting the gas turbine engine assembly.

In another aspect, a power take-off system for a gas turbine engine is provided. The system includes a starter coupled to the second spool, and a clutch assembly coupled between the starter and the first spool, the clutch assembly configured to couple the first spool to the starter when starting the gas turbine engine assembly.

In a further aspect, a gas turbine engine assembly is provided. The gas turbine engine assembly includes a first spool comprising a high-pressure compressor, a high-pressure turbine, and shaft coupled between the high-pressure compressor and the high-pressure turbine, a second spool that is disposed coaxially with the first spool, and a power take-off system including a starter rotatably coupled to the second spool and selectively coupled to the first spool when starting the gas turbine engine assembly.

DETAILED DESCRIPTION OF THE INVENTION

Figure 1:
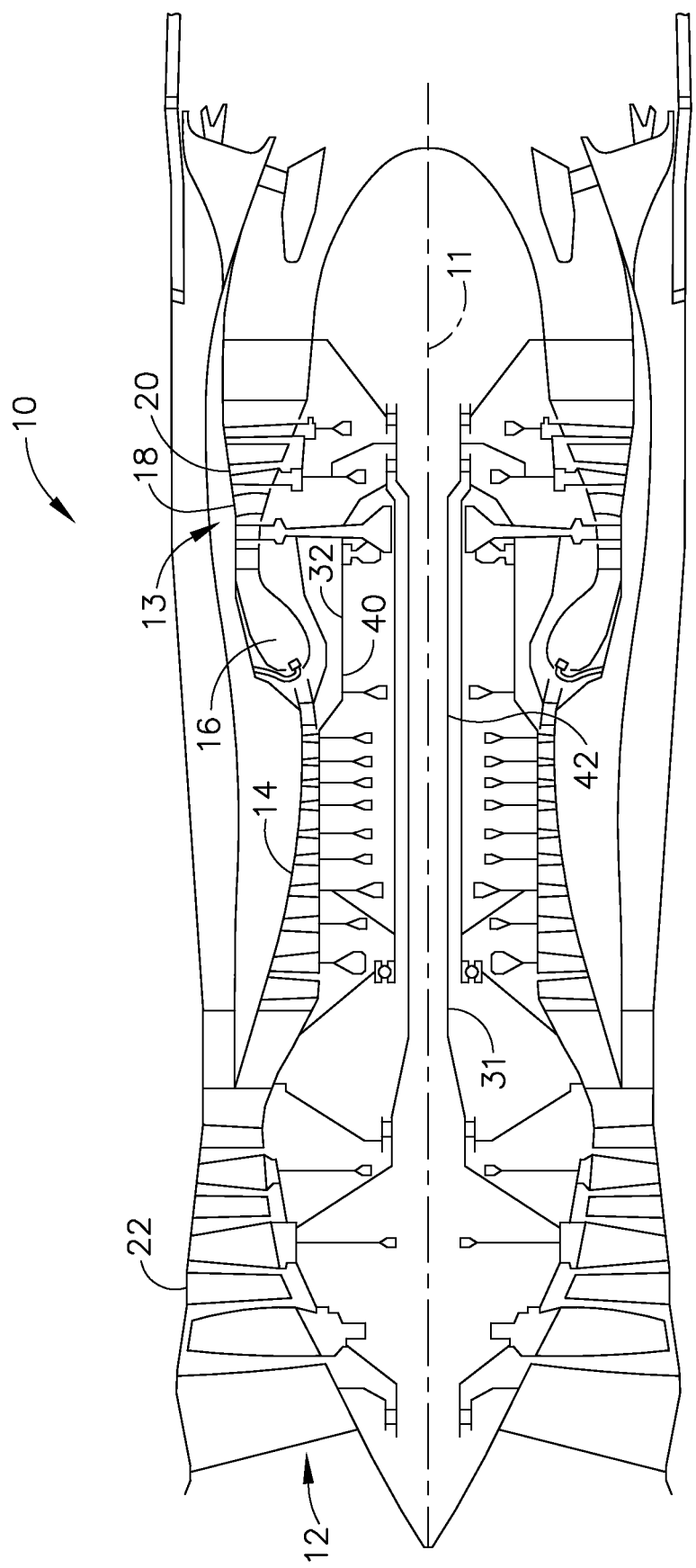
FIG. 1 is a cross-sectional view of an exemplary gas turbine engine assembly.

FIG. 1 is a cross-sectional view of a gas turbine engine assembly 10 having a longitudinal axis 11. Gas turbine engine assembly 10 includes a fan assembly 12 and a core gas turbine engine 13. Core gas turbine engine 13 includes a high-pressure compressor 14, a combustor 16 that is disposed downstream from high-pressure compressor 14, and a high-pressure turbine 18 that is coupled to high-pressure compressor 14 via a first shaft 32. In the exemplary embodiment, gas turbine engine assembly 10 also includes a low-pressure turbine 20 that is disposed downstream from core gas turbine engine 13, a multi-stage fan assembly 12, and a shaft 31 that is used to couple fan assembly 12 to low-pressure turbine 20. In the exemplary embodiment, gas turbine engine assembly 10 is a two spool engine wherein the high-pressure compressor 14, high-pressure turbine 18 and shaft 32 form a first spool 40, and fan assembly 12, low-pressure turbine 20 and shaft 31 form a second spool 42.

In operation, air flows through fan assembly 12. A portion of the compressed air that is discharged from fan assembly 12 is channeled through compressor 14 wherein the airflow is further compressed and delivered to combustor 16. Hot products of combustion (not shown) from combustor 16 are utilized to drive turbines 18 and 20, and turbine 20 is utilized to drive fan assembly 12 by way of shaft 31. Gas turbine engine assembly 10 is operable at a range of operating conditions between design operating conditions and off-design operating conditions.

Figure 2:
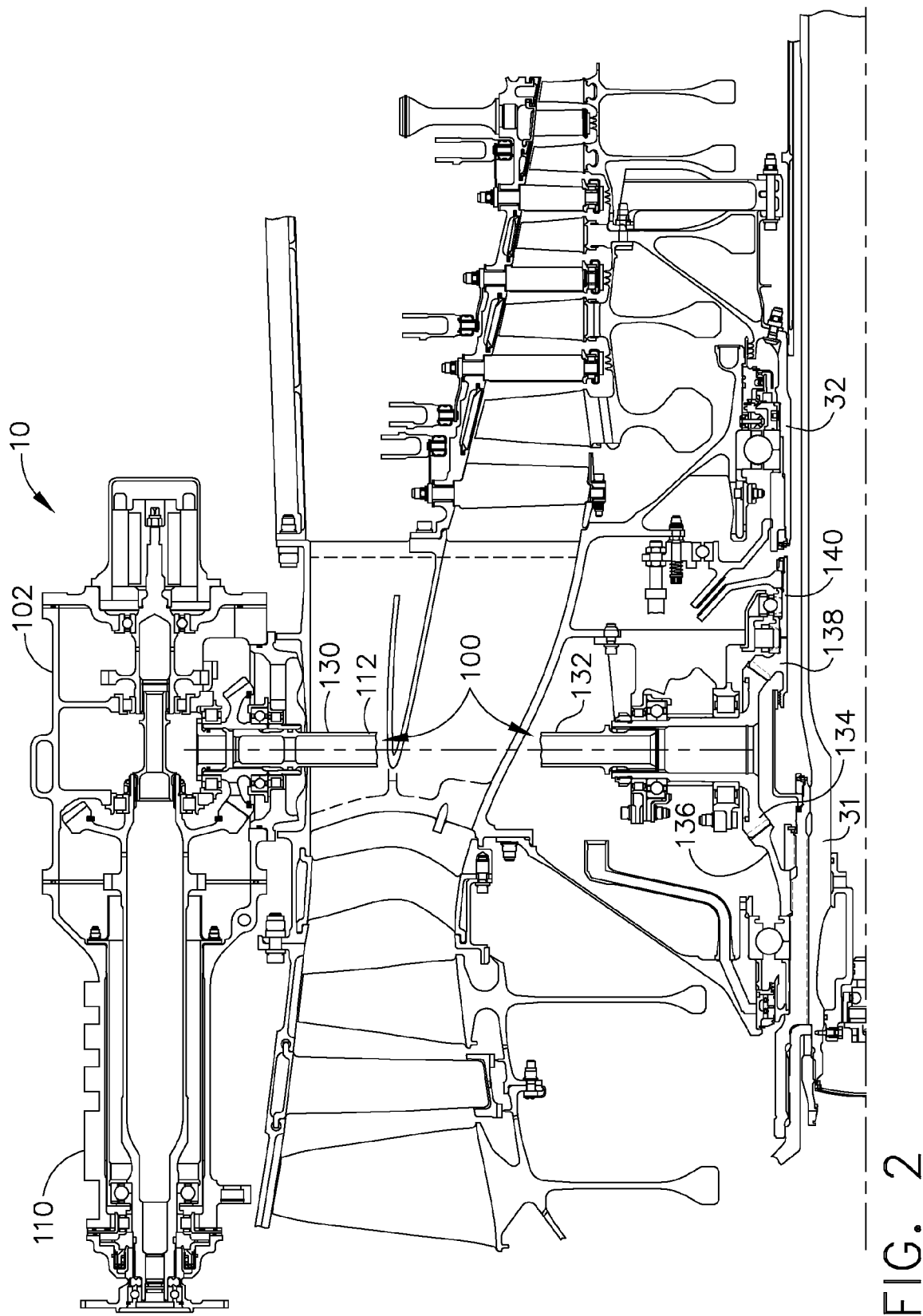
FIG. 2 is a cross-sectional view of a portion of the gas turbine engine assembly shown in FIG. 1 including an exemplary power take-off system.

FIG. 2 is a cross-sectional view of a portion of the gas turbine engine assembly 10 shown in FIG. 1 including an exemplary power take-off system 100. Power take-off system 100 includes a starter 102 that includes a motor/generator 110. Starter, as used herein, is defined as a device that in one mode is operable as a motor to start the first spool 40, and is also operable in a second mode as a generator that may be driven by either the first spool 40 and/or the second spool 42 to generate electrical power during predetermined engine operations that are discussed below.

Starter 102 includes a motor/generator 110 and a shaft 112 that is utilized to couple starter 102 to first spool 40 and/or second spool 42. More specifically, shaft 112 includes a first end 130 that is coupled to and thus driven by motor/generator 110. Shaft 112 also includes a second end 132 and a pinion 134 that is coupled or splined to second end 132. Moreover, power take-off system 100 also includes a first ring gear 136 that is coupled or splined to rotor shaft 31, and a second ring gear 138 that is coupled to an extension shaft 140 that will be discussed further below. In the exemplary embodiment, pinion 134, ring gear 136, and ring gear 138 are each bevel gears that are machined such that pinion 134 is intermeshed with ring gears 136 and 138.

Figure 3:
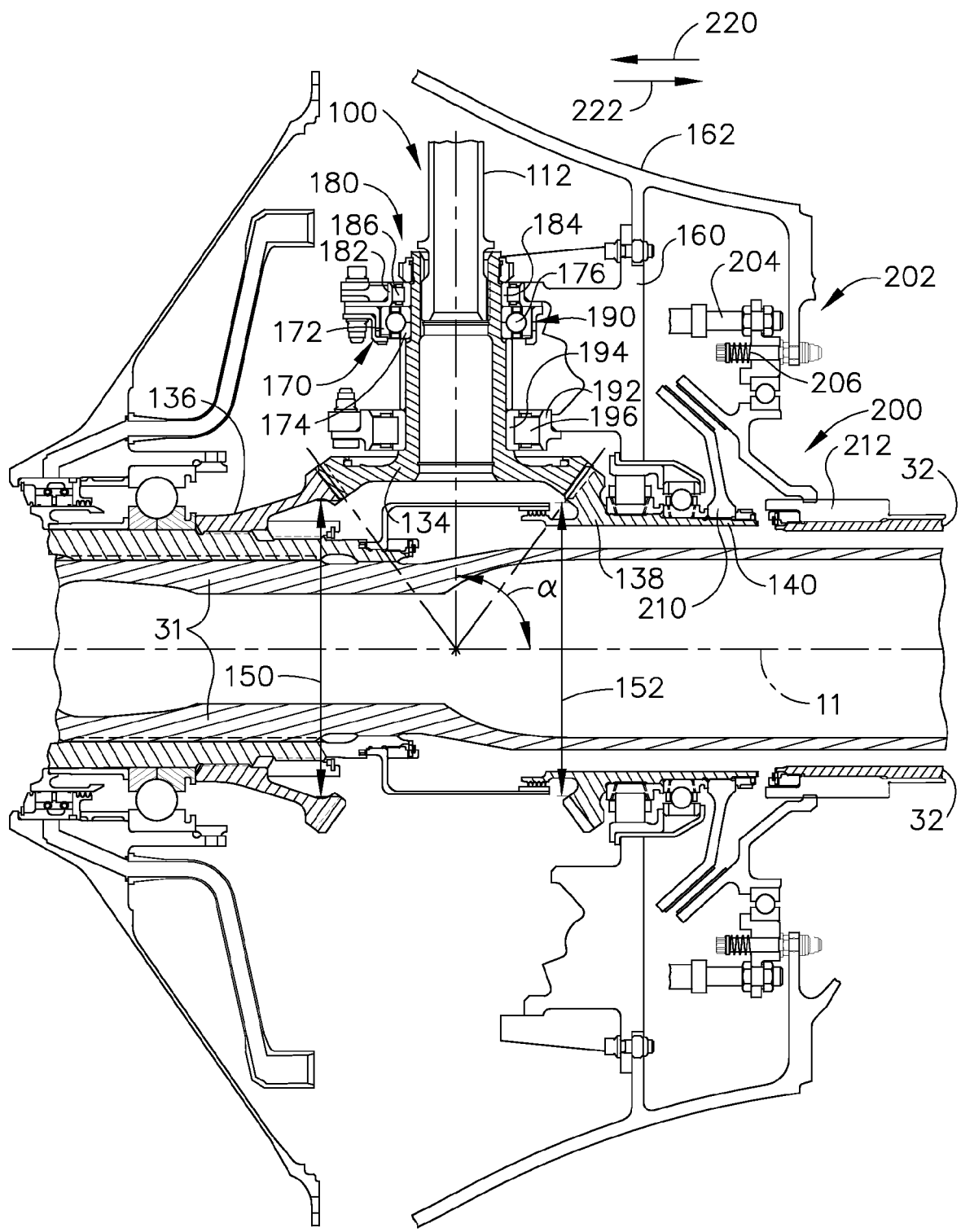
FIG. 3 is a cross-sectional view of a portion of the exemplary power take-off system shown in FIG. 2.
Figure 4:
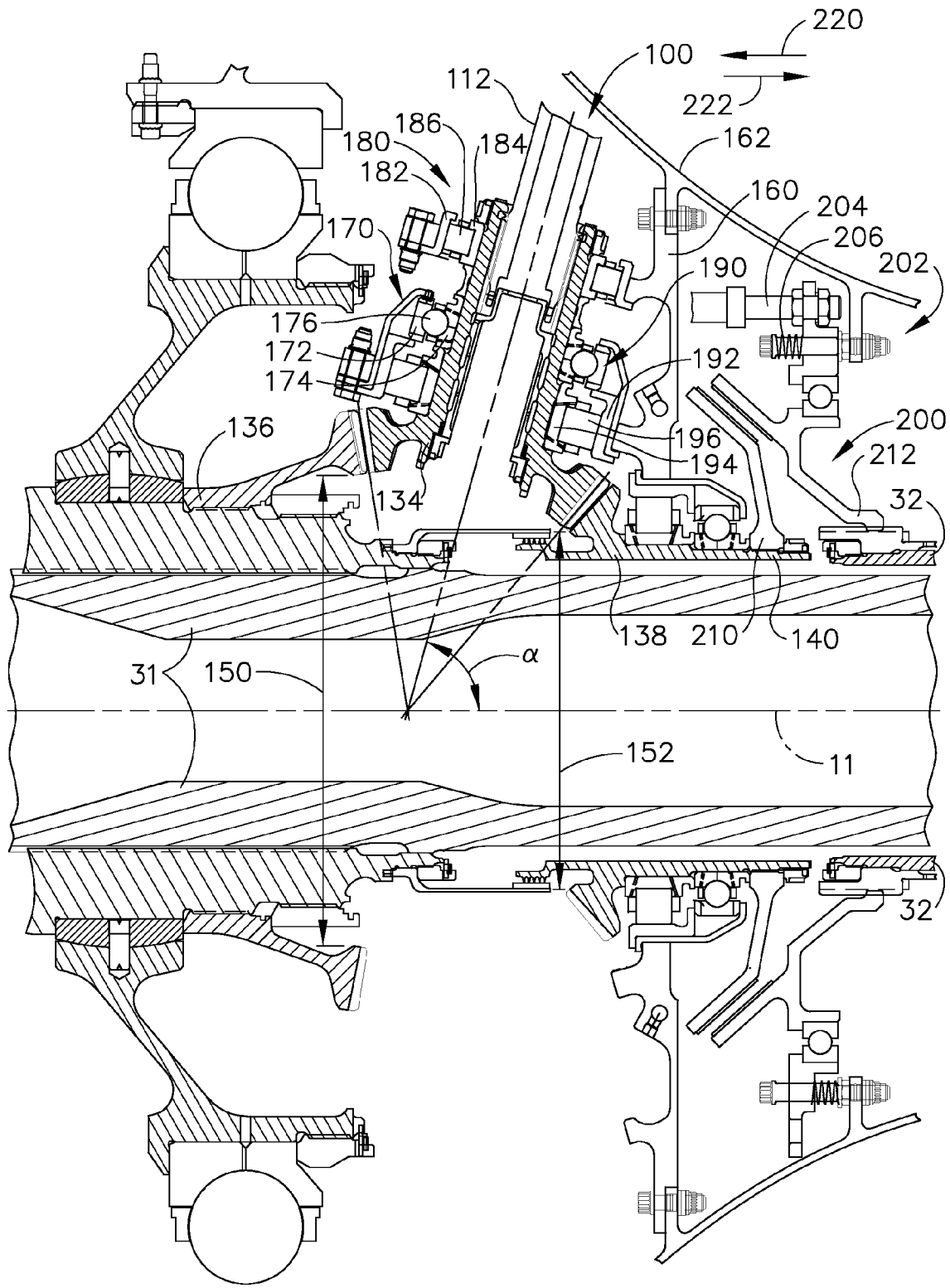
FIG. 4 is a cross-sectional view of another exemplary power take-off system.

FIG. 3 is a cross-sectional view of a portion of the exemplary power take-off system 100 shown in FIG. 2. FIG. 4 is a cross-sectional view of a portion of the exemplary power take-off system 100 shown in FIG. 2 in a second configuration. In one embodiment, second ring gear 138 is formed unitarily with extension shaft 140. Optionally, second ring gear 138 is coupled to extension shaft 140 using a plurality of splines, for example. In the exemplary embodiment, first ring gear 136 has a first diameter 150 and second ring gear 138 has a second diameter 152 that is approximately equal to first diameter 150. As such, and as shown in FIG. 3, drive shaft 112 is approximately perpendicular to centerline axis 11. Optionally, as shown in FIG. 4, first ring gear 136 has a first diameter 150 and second ring gear 138 has a second diameter 152 that is less that first diameter 150 such that drive shaft 112 is disposed at an angle α with respect to centerline axis 11. In the exemplary embodiment, angle α is between approximately 45 degrees and approximately ninety degrees depending on the diameters of rings gears 136 and 138.

To support both drive shaft 112 and extension shaft 140, power take-off system 100 also includes a shaft support structure 160 that is coupled to a rigid structure, such as a fan frame 162. Power take-off system 100 also includes a plurality of bearing assemblies to facilitate maintaining shaft 112 in the proper position within gas turbine engine assembly 10. Specifically, power take-off system 100 includes a first thrust bearing 170 that includes a stationary outer race 172 that is secured to a stationary structure such as support structure 160, a rotating inner race 174 that is secured to pinion 134, and a plurality of rolling elements 176 that are disposed between outer and inner races 172 and 174 respectively.

Power take-off system 100 includes a first roller bearing 180 that includes a stationary outer race 182 that is secured to support structure 160, a rotating inner race 184 that is secured to pinion 134, and a plurality of rolling elements 186 that are disposed between outer and inner races 182 and 184 respectively. During operation, roller bearing 180 facilitates maintaining shaft 112 in a substantially fixed radial alignment within gas turbine engine assembly 10.

Power take-off system 100 includes a second roller bearing 190 that includes a stationary outer race 192 that is secured to support structure 160, a rotating inner race 194 that is secured to pinion 134, and a plurality of rolling elements 196 that are disposed between outer and inner races 192 and 194 respectively. During operation, roller bearing 190 facilitates maintaining shaft 112 in a substantially fixed radial alignment within gas turbine engine assembly 10. In the exemplary embodiment, second roller bearing assembly 190 is disposed radially inwardly from first roller bearing assembly 180.

During operation, and as shown in FIGS. 2, 3, and 4, starter 102 is coupled to and thus drives or is driven by second spool 42 during all engine operations. That is, pinion 134 is always coupled to ring gear 136 such that the second spool 42 drives or is driven by starter 102. For example, in one embodiment, after core engine 13 is running, thus causing the second spool 42 to rotate from expansion energy extracted from turbine 20, starter 102 is thus caused to rotate such that starter 102 is functioning as a generator to produce electrical power that may be utilized by the aircraft or as desired. Optionally, since starter 102 is always coupled to second spool 42, starter 102 may be utilized as a motor to restart the core gas turbine engine during selected flight conditions.

Figure 6:
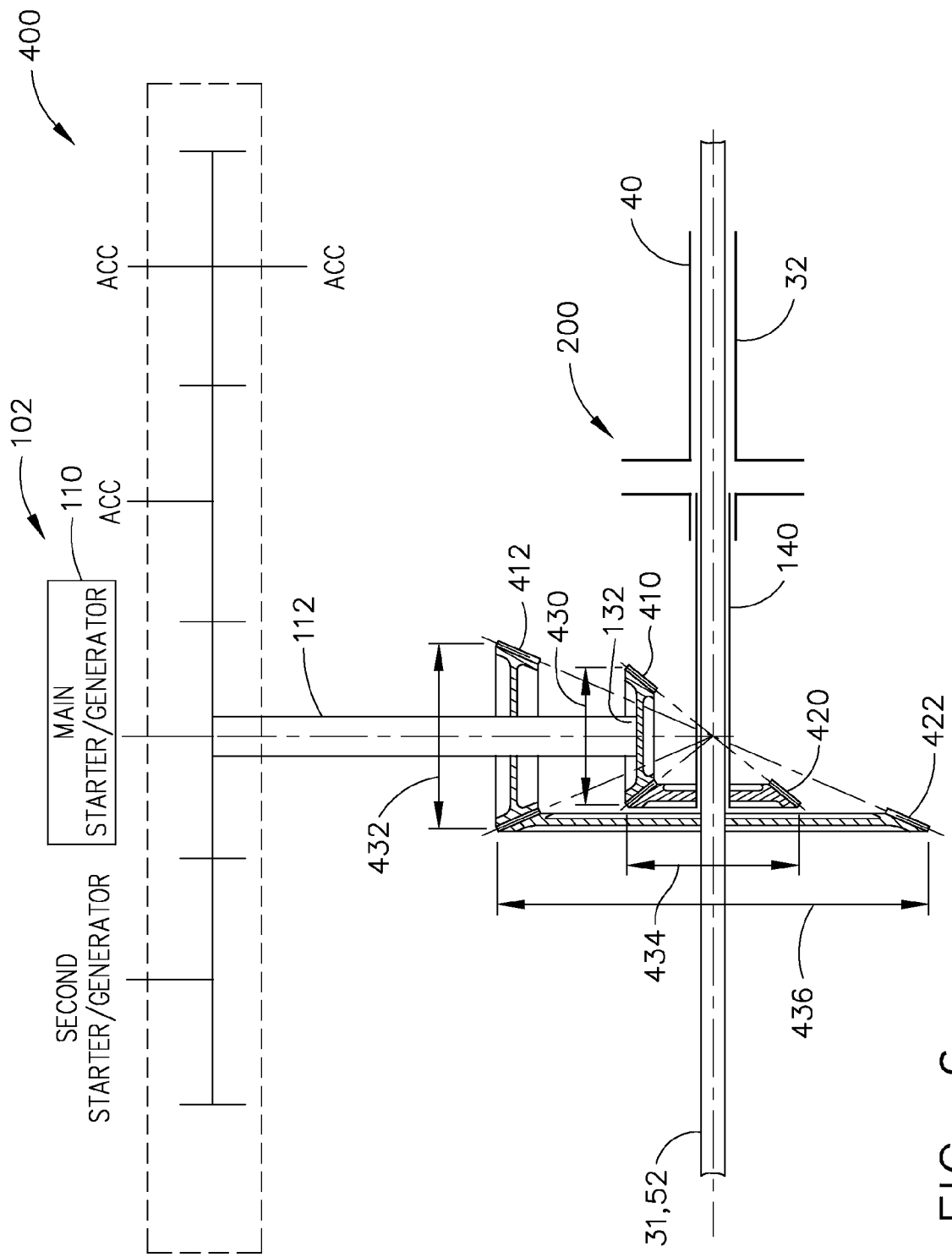
FIG. 6 is a simplified illustration of another exemplary power take-off system that may be used with the gas turbine engines shown in FIG. 1 and FIG. 4.
Figure 7:
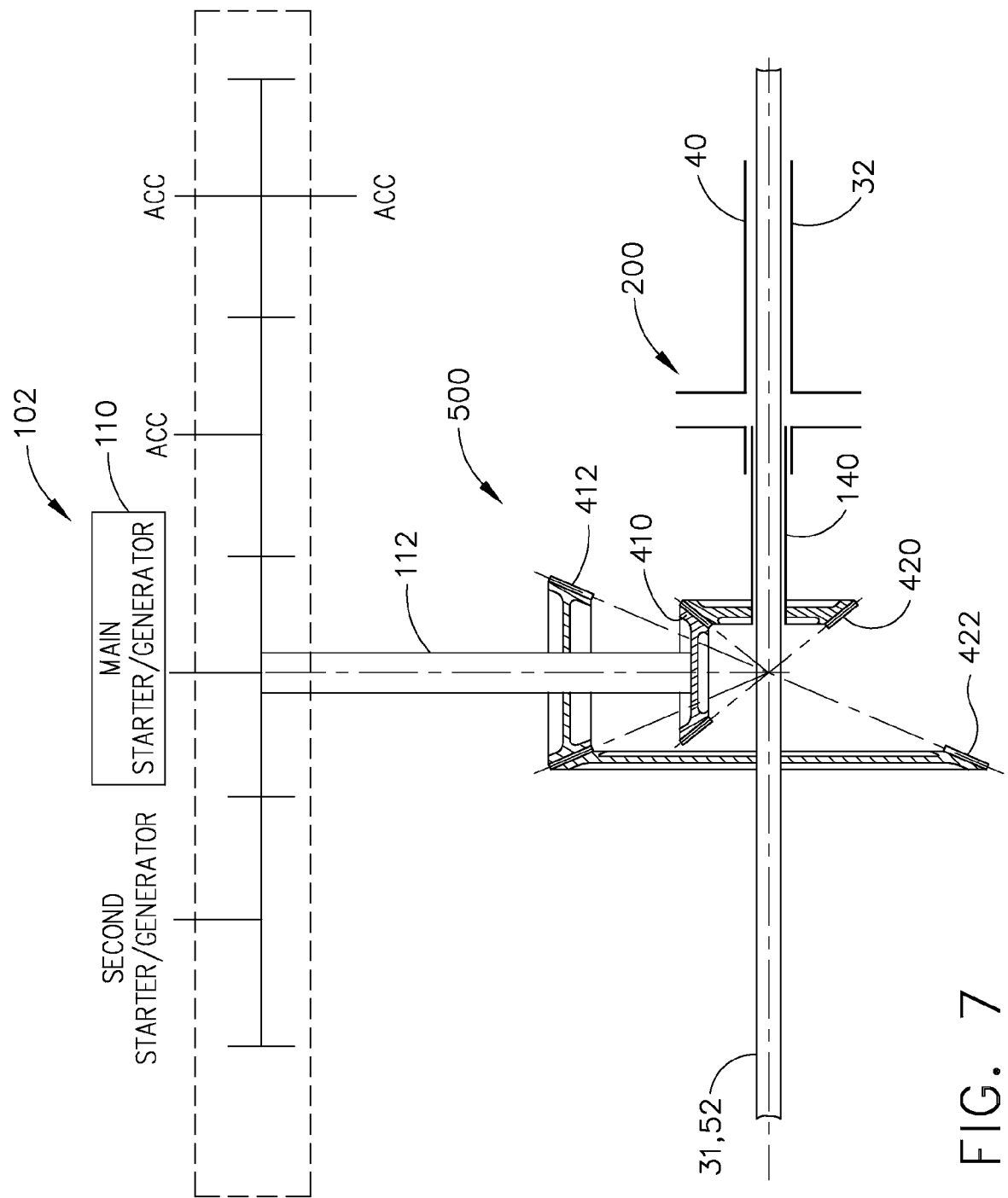
FIG. 7 is a simplified illustration of another exemplary power take-off system that may be used with the gas turbine engines shown in FIG. 1 and FIG. 4.

Since, under typical operations the first spool 40 is rotating at a rotational speed that is different than the rotational speed of second spool 42. Power take-off system 100 is configured to compensate for the different rotational speeds. More specifically, the diameters of ring gears 136 and 138 are each selected based on the rotational speed of the components that are driven by or are driving starter 102. For example, in this embodiment, since ring gear 136 is coupled to second spool 42 which in this embodiment rotates at a speed that is less than the rotational speed of the first spool 40, ring gear 36 has a diameter 150 that is greater than a diameter 152 of ring gear 138 to compensate for the speed differential between the first and second spools 40 and 42. As such, it should be realized that the diameters 150 and 152 of the ring gears 36 and 38 are selected based on the rotational speeds of the first and seconds spools 40 and 42 and thus may be resized to operate with different type engine and fan assemblies operating at different speeds as shown in FIGS. 6 and 7.

As discussed and illustrated above, starter 102 is also selectively engageable to the first spool 40 when starting the gas turbine engine assembly. For example, to start the core gas turbine engine 13, including the first spool 40, starter 102 is selectively coupled to the first spool 40. Starter 102 is then operated as a motor to rotate the first spool 40 and thus restart core gas turbine engine 13. To selectively couple starter 102 to the first spool 40, power take-off system 100 also includes a clutch 200 and a clutch actuator 202 that is utilized to activate or engage clutch 200. In the exemplary embodiment, clutch actuator 202 includes at least a solenoid 204 and a spring 206.

Clutch 200 includes a first clutch portion 210 that is securely coupled to extension shaft 140, and a second clutch portion 212 that is movably coupled to first spool 40. In the exemplary embodiment, second clutch portion 212 is coupled to shaft 32 utilizing a plurality of splines such that second clutch portion 212 is enabled to be moved in either an upstream direction 220 or a downstream direction 222.

For example, during a first mode of operation in which an operator desires to start core gas turbine engine 13, solenoid 204 is activated, depressing spring 206, and causing second clutch portion 212 to move in the upstream direction 220 and thus contact or engage first clutch portion 210. Starter 102 is then activated causing both the first spool 40 and second spool 42 to rotate. While the first spool 40 is rotating, fuel may be supplied to the core gas turbine engine 13 to be started as known in the art.

In a second mode of operation, after core gas turbine engine 13 is running, solenoid 204 may be deactivated, causing spring 206 to push second clutch portion 212 in the downstream direction 222 and thus disengage from first clutch portion 210. In this mode, only second spool 42 is driving starter 102, and starter 102 is functioning as a generator to produce electrical power.

Although actuator 202 is described herein as including solenoid 204 that is activated to engage clutch 200, it should be realized that solenoid 204 and spring 206 may be repositioned such that solenoid 204 is deactivated to engage clutch 200 and activated to disengage clutch 200. Moreover, although clutch 200 is described as a friction clutch, it should be realized the clutch 200 may be of any type of clutch that is capable of engaging starter 102 to first spool 40. For example, clutch 200 may be an overrunning clutch or include a clutch pack assembly.

Figure 5:
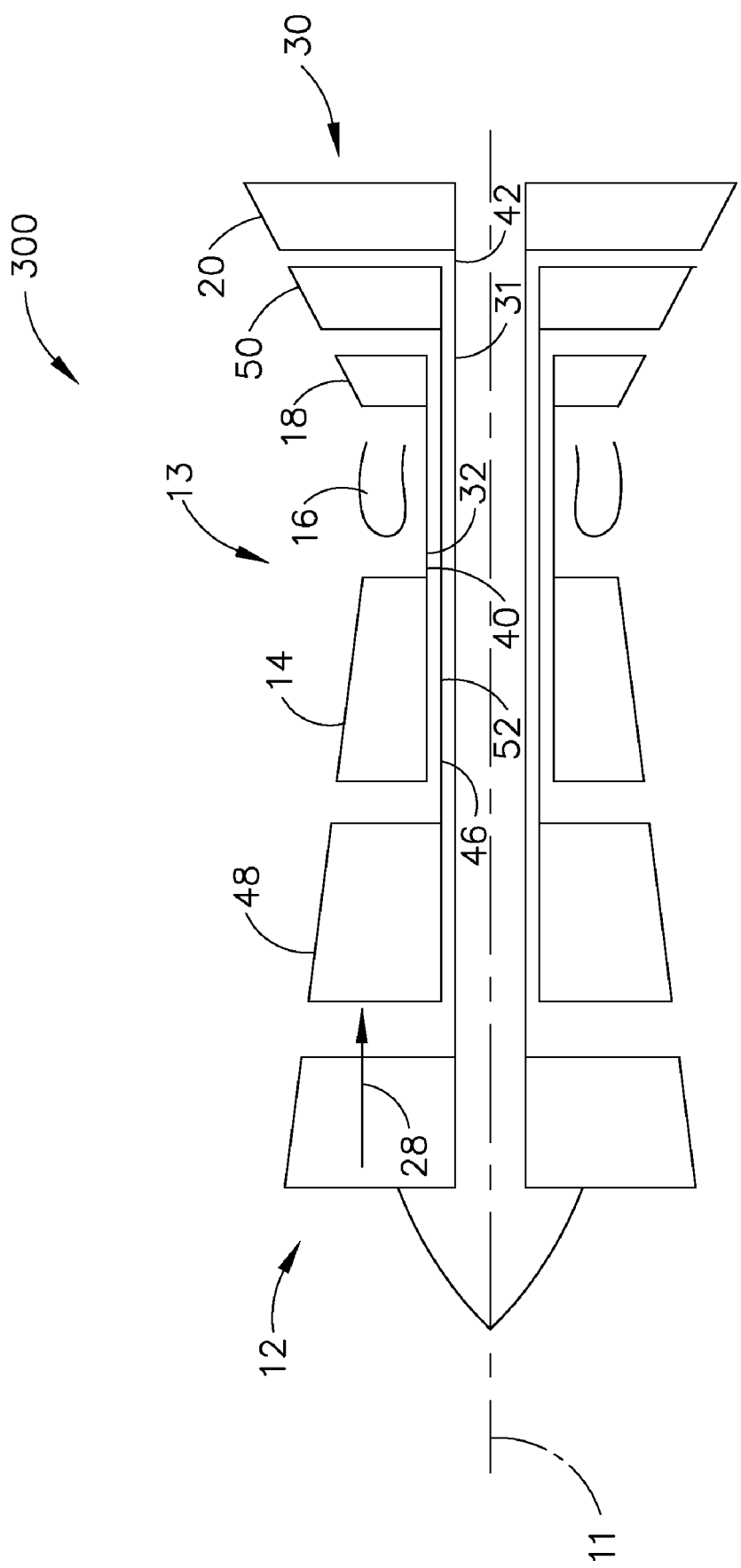
FIG. 5 is a cross-sectional view of another exemplary gas turbine engine assembly.

FIG. 5 is a cross-sectional view of another exemplary gas turbine engine assembly 300 having a longitudinal axis 11. Gas turbine engine assembly 300 is substantially similar to gas turbine engine assembly 10 shown in FIG. 1. Accordingly, items illustrated in FIG. 1 that are also included in FIG. 5 will identified with the same number. In this embodiment, gas turbine engine assembly 300 is a multispool engine that includes a fan assembly 12 and a core gas turbine engine 13.

Core gas turbine engine 13 includes a high-pressure compressor 14, a combustor 16 that is disposed downstream from high-pressure compressor 14, and a high-pressure turbine 18 that is coupled to high-pressure compressor 14 via a first shaft 32. In the exemplary embodiment, gas turbine engine assembly 300 also includes a low-pressure turbine 20 that is disposed downstream from core gas turbine engine 13, and a shaft 31 that is used to couple fan assembly 12 to low-pressure turbine 20. Gas turbine engine assembly 300 has an intake side 28 and an exhaust side 30. In the exemplary embodiment, gas turbine engine assembly 300 is a three spool engine wherein the high-pressure compressor 14, high-pressure turbine 18 and shaft 32 form a first spool 40, and fan assembly 12, low-pressure turbine 20 and shaft 31 form a second spool 42.

Gas turbine engine assembly 300 also includes a third spool 46 that includes a booster compressor 48 that is disposed axially between the fan assembly 12 and high-pressure compressor 14 and a booster turbine 50 that is disposed between high-pressure turbine 18 and low-pressure turbine 20. Third spool 46 also includes a shaft 52 that couples booster compressor 48 to booster turbine 50.

In operation, air flows through fan assembly 12 and a first portion of the airflow is channeled through booster compressor 48. The compressed air that is discharged from booster compressor 48 is channeled through compressor 14 wherein the airflow is further compressed and delivered to combustor 16. Hot products of combustion (not shown) from combustor 16 are utilized to drive turbines 18, 50 and 20. Gas turbine engine assembly 300 is operable at a range of operating conditions between design operating conditions and off-design operating conditions.

FIG. 6 is a simplified illustration of another exemplary power take-off system 400 that may be used with any multi-spool gas turbine engine including the two spool engine 10 shown in FIG. 1 and the three spool engine shown in FIG. 5. As discussed above, each exemplary power take-off system described herein is configured to be continuously coupled to either the second or third spool of a gas turbine engine and selectively coupled to the first spool, i.e. the core gas turbine engine, during selected engine operations.

In this arrangement, since under typical starting operations the first spool 40 is rotating at a rotational speed that is different than the rotational speed of the other spool, either second or thirds spools 42 or 46, power take-off system 400 is configured to compensate for the different rotational speeds. More specifically, in this embodiment, shaft 112 includes a first pinion 410 that is disposed proximate to shaft second end 132 and a second pinion 412 that is disposed radially outwardly from first pinion 410 on shaft 112. Power take-off system 400 also includes a first ring gear 420 that is coupled to the extension shaft 140 and thus to the first spool 40 via clutch 200. Moreover, power take-off system 400 also includes a second ring gear 422, that in one embodiment is coupled to shaft 31 if a two spool engine is utilized or to shaft 52 if a three spool engine is utilized. First pinion 410 has a first diameter 430 and second pinion 412 has a second diameter 432 that in the exemplary embodiment is greater than the first pinion diameter 430. Ring gear 420 has a first diameter 434 and ring gear 422 has a second diameter 436 that in the exemplary embodiment is greater than the diameter of first ring gear diameter 434. The diameters for each of the first and second ring gears and the first and second pinions are each selected based on the rotational speed of the components that are driven by or are driving starter 102.

For example, in this embodiment, since ring gear 422 is coupled to either second spool 42 or third spool 46 which in this embodiment each rotate at a speed that is less than the rotational speed of the first spool 40, ring gear 422 has a diameter 436 that is greater than a diameter 434 of ring gear 420 to compensate for the speed differential between the first spool 40 and the second and third spools 42 and/or 46. Moreover, each respective pinion coupled to a respective ring gear is also sized to reflect this increased diameter based on the rotational speeds of the various spools. As such, it should be realized that diameters 430, 432, 434, and 436 are selected based on the rotational speeds of the first and second and/or third spools 40, 42, and/or 46, and the desired starter capacity or desired generator output 110.

FIG. 7 is a simplified illustration of another exemplary power take-off system 500 that may be used with any multi-spool gas turbine engine including the two spool engine 10 shown in FIG. 1 and the three spool engine 300 shown in FIG. 5. In this arrangement, power take-off system 500 is configured to be coupled to a counter-rotating gas turbine engine. Specifically, power take-off system 500 is configured to coupled to a gas turbine engine that includes a least a first spool that rotates in a first direction and a second spool that rotates in an opposite second direction. In the exemplary embodiment, the first spool 40 is the core engine spool, and the second spool may be either second spool 42 if a two-spool engine 10 is utilized or spool 46 if a three-spool engine 300 is utilized.

More specifically, to coupled each spool to a single shaft 112 and thus drive starter 102, first ring gear 420 is disposed on the downstream side of first pinion 410. In this arrangement, each ring gear 420 and 422 will drive shaft 112 in a single rotational direction while at least two of the spools are counter-rotating.

Described herein is a method for assembling a gas turbine engine assembly is provided. The gas turbine engine assembly includes a first spool including a high-pressure compressor, a high-pressure turbine, and shaft coupled between the high-pressure compressor and the high-pressure turbine, and a second a second spool that is disposed coaxially with the first spool. The method includes coupling a starter to the second spool using a drive shaft, and coupling a clutch assembly between the starter and the first spool such that the clutch assembly is configured to couple the starter to the first spool when starting the gas turbine engine assembly.

Also, described herein is a gas turbine engine assembly that is configured to extract relatively large amounts of power from the engine while operating the engine at low thrust conditions. Specifically, the gas turbine engine assembly described herein includes a dual input, i.e. input from both the first spool 40 and at least one of the second spool 42 and the third spool 46, that may be used to drive starter 102 during ground start to rotate both spools of gas turbine engine assembly 10. Specifically, the system described herein is configured to extract additional electrical power from the gas turbine engine while the gas turbine engine is operating at low thrust conditions and/or certain flight conditions.

More specifically, the power take-off system described herein includes a clutch assembly that may be utilized to engage or disengage the first spool from the starter such that during a first mode the starter may be engaged to start the core gas turbine engine, and during a second mode the starter may be disengaged such that the starter is driven solely by the second spool and functions as a generator to produce electrical power.

For the aircraft/engine mission, the second spool provides the majority of the needed aircraft power and also drives the appropriate engine accessories. As a result, additional energy is extracted from the second spool including either the booster turbine or the low-pressure turbine to support ever increasing electrical demands. Specifically, newer aircraft are designed to require an atypically large amount of electrical power to be supplied by the generator on the engine accessory gearbox.

The power requirements during idle conditions thus require the engine to run at idle speeds that are higher than desirable in order to maintain adequate compressor stall margin. This results in thrust levels for the engine that are higher than desired for both flight idle descent points and ground idle conditions, which has both maintenance cost implications for aircraft brakes and excess fuel burn penalties for typical short range missions.

Whereas the system described herein, takes power off the second spool to provide the majority of the power requirements. As a result, the system described herein is relatively simple to install, and also provides a low weight solution to this problem. Moreover, the system described herein, allows for reduced thrust during ground idle conditions to reduce aircraft brake maintenance, reduced dirt ingestion, and reduced flight idle thrusts for an improved flight profile and improved short range fuel burn while still maintaining adequate compressor stall margin during high power extraction conditions.

While the invention has been described in terms of various specific embodiments, those skilled in the art will recognize that the invention can be practiced with modification within the spirit and scope of the claims.

What is claimed is:

1. A method for assembling a gas turbine engine assembly including a first spool including a high-pressure compressor, a high-pressure turbine, and shaft coupled between the high-pressure compressor and the high-pressure turbine, and a second spool that is disposed coaxially with the first spool, said method comprising:
   coupling a starter to the second spool using a drive shaft; and
   coupling a clutch assembly between the starter and the first spool, wherein the clutch assembly includes a clutch and a clutch actuator configured to axially move a portion of the clutch to at least one of selectively couple the starter to the first spool when starting the gas turbine engine assembly and selectively uncouple the starter from the first spool after the gas turbine engine assembly has started.

2. A method in accordance with claim 1, wherein the drive shaft includes a first end and a second end, said method further comprising:
   coupling the drive shaft first end to the starter;
   coupling a first pinion to the drive shaft second end; and
   coupling a first ring gear to the first spool, the first pinion configured to mesh with the first ring gear.

3. A method in accordance with claim 2, further comprising coupling a second ring gear to the second spool such that the second ring gear meshes with the first pinion.

4. A method in accordance with claim 1, further comprising:
   coupling a first ring gear having a first diameter to the first spool;
   coupling a second ring gear having a second diameter to the second spool, wherein the first diameter is less than the second diameter; and
   coupling the drive shaft to the first and second ring gears such that the drive shaft is displaced from a centerline axis by an angle $\alpha$.

5. A method in accordance with claim 2 further comprising:
   coupling a second ring gear to the second spool; and
   coupling a second pinion to the drive shaft such that the second pinion is disposed radially outward from the first pinion on the drive shaft and such that the second pinion is configured to mesh with the second ring gear.

6. A power take-off system for a gas turbine engine assembly, said power take-off system comprising:
   a first spool;
   a second spool;
   a starter configured to be coupled to said second spool; and
   a clutch assembly configured to be coupled between said starter and said first spool, said clutch assembly comprising a clutch and a clutch actuator configured to axially move a portion of said clutch to at least one of selectively couple said starter to said first spool when starting the gas turbine engine assembly and selectively uncouple said starter from said first spool after the gas turbine engine assembly has started.

7. A power take-off system in accordance with claim 6, wherein said second spool comprises a fan assembly, a low-pressure turbine, and a shaft coupled between said fan assembly and said low-pressure turbine.

8. A power take-off system in accordance with claim 6, wherein said second spool comprises a booster compressor, a booster turbine, and a shaft coupled between said booster compressor and said booster turbine.

9. A power take-off system in accordance with claim 6, further comprising:
   a drive shaft comprising a first end and a second end, said drive shaft first end coupled to said starter;
   a first pinion coupled to said drive shaft second end; and
   a first ring gear coupled to said first spool, said first pinion configured to mesh with said first ring gear.

10. A power take-off system in accordance with claim 9, further comprising a second ring gear coupled to said second spool, said second ring gear configured to mesh with said first pinion.

11. A power take-off system in accordance with claim 10, wherein said first ring gear has a first diameter and said second ring gear has a second diameter that is less than the first diameter such that said drive shaft is displaced from a centerline axis by an angle $\alpha$.

12. A power take-off system in accordance with claim 9, wherein said power take-off system further comprises:
   a second ring gear coupled to said second spool; and
   a second pinion coupled to said drive shaft, said second pinion disposed radially outward from said first pinion on said drive shaft and configured to mesh with said second ring gear.

13. A power take-off system in accordance with claim 9, wherein said first ring gear has a first diameter and said second ring gear has a second diameter that is less than the first diameter, and said first pinion has a first pinion diameter and said second pinion has a second pinion diameter that is greater than the first pinion diameter.

14. A power take-off system in accordance with claim 6, wherein said starter comprises a motor/generator that is coupled to at least one of said first and second spools, said motor/generator configured to rotate a portion of the gas turbine engine assembly when operating in a first mode and to generate electrical energy when operating in a second mode.

15. A gas turbine engine assembly comprising:
   a first spool comprising a high-pressure compressor, a high-pressure turbine, and a first shaft coupled between said high-pressure compressor and said high-pressure turbine;
   a second spool disposed coaxially with said first spool; and
   a power take-off system comprising a starter and a clutch assembly, wherein said clutch assembly comprises a clutch and a clutch actuator configured to axially move a portion of said clutch to at least one of selectively couple said starter to said first spool when starting said gas turbine engine assembly and selectively uncouple said starter from said first spool after said gas turbine engine assembly has started.

16. A gas turbine engine assembly in accordance with claim 15, wherein said second spool comprises a fan assembly disposed upstream from said high-pressure compressor, a low-pressure turbine disposed downstream from said high-pressure turbine, and a second shaft coupled between said fan assembly and said low-pressure turbine.

17. A gas turbine engine assembly in accordance with claim 15, wherein said second spool comprises a booster compressor disposed upstream from said high-pressure compressor, a booster turbine disposed downstream from said high-pressure turbine, and a second shaft coupled between said booster compressor and said booster turbine.

18. A gas turbine engine assembly in accordance with claim 17, further comprising a third spool disposed coaxially with said first and second spools, said third spool comprising a fan assembly disposed upstream from said booster compressor, a low-pressure turbine disposed downstream from said booster turbine, and a third shaft coupled between said fan assembly and said low-pressure turbine.

19. A gas turbine engine assembly in accordance with claim 15, wherein said power take-off system further comprises:
    a drive shaft comprising a first end and a second end, said drive shaft first end coupled to said starter;
    a first pinion coupled to said drive shaft second end; and
    a first ring gear coupled to said first spool, said first pinion configured to mesh with said first ring gear.

20. A gas turbine engine assembly in accordance with claim 19, wherein said power take-off system further comprises:
    a second ring gear coupled to said second spool, said second ring gear configured to mesh with said first pinion.

21. A gas turbine engine assembly in accordance with claim 20, wherein said first ring gear has a first diameter and said second ring gear has a second diameter that is less than the first diameter such that said drive shaft is displaced from a centerline axis by an angle $\alpha$.

22. A gas turbine engine assembly in accordance with claim 19, wherein said power take-off system further comprises:
    a second ring gear coupled to said second spool; and
    a second pinion coupled to said drive shaft, said second pinion disposed radially outward from said first pinion on said drive shaft and configured to mesh with said second ring gear.

23. A gas turbine engine assembly in accordance with claim 21, wherein said first ring gear has a first diameter and said second ring gear has a second diameter that is less than the first diameter, and said first pinion has a first pinion diameter and said second pinion has a second pinion diameter that is greater than the first pinion diameter.

24. A gas turbine engine assembly in accordance with claim 15, wherein said starter comprises a motor/generator coupled to at least one of said first and second spools, said motor/generator configured to rotate a portion of said gas turbine engine assembly when operating in a first mode and to generate electrical energy when operating in a second mode.

25. A gas turbine engine assembly in accordance with claim 15, wherein said first spool is configured to rotate in a first direction and said second spool is configured to rotate in a second direction that is opposite the first direction.

* * * * *